United States Patent
Noah-Navarro

(10) Patent No.: US 8,925,993 B2
(45) Date of Patent: Jan. 6, 2015

(54) MOUNTING FEATURE TO CROSS CAR BEAM

(71) Applicant: DENSO International America, Inc., Southfield, MI (US)

(72) Inventor: Jonathan Noah-Navarro, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 13/864,899

(22) Filed: Apr. 17, 2013

(65) Prior Publication Data

US 2014/0117700 A1　May 1, 2014

Related U.S. Application Data

(60) Provisional application No. 61/718,864, filed on Oct. 26, 2012.

(51) Int. Cl.
*B60H 1/00* (2006.01)

(52) U.S. Cl.
CPC ................................. *B60H 1/0055* (2013.01)
USPC .................... 296/72; 296/193.02; 296/203.02

(58) Field of Classification Search
USPC ........... 296/70, 72, 194, 208, 203.02, 193.02; 29/458, 525.13, 897.2
See application file for complete search history.

(56) References Cited

U.S. PATENT DOCUMENTS

| | | | | |
|---|---|---|---|---|
| 282,511 | A * | 8/1883 | Fowler | 296/72 |
| 5,678,877 | A | 10/1997 | Nishijima et al. | |
| 5,934,733 | A * | 8/1999 | Manwaring | 296/72 |
| 6,139,082 | A * | 10/2000 | Davis et al. | 296/72 |
| 6,450,533 | B1 * | 9/2002 | Kimura et al. | 280/779 |
| 6,554,352 | B2 | 4/2003 | Nagy | |
| 6,560,872 | B2 * | 5/2003 | Morrison et al. | 29/897.2 |
| 6,582,011 | B2 | 6/2003 | Palazzolo et al. | |
| 6,921,127 | B2 | 7/2005 | Feith et al. | |
| 6,988,764 | B2 | 1/2006 | Matsutani | |
| 7,344,159 | B2 | 3/2008 | Park | |
| 7,503,622 | B2 | 3/2009 | Vican | |
| 7,530,405 | B2 | 5/2009 | Kollath et al. | |
| 7,735,905 | B2 | 6/2010 | Mullen et al. | |
| 8,313,134 | B2 | 11/2012 | Wenzel et al. | |
| 2003/0193207 | A1 * | 10/2003 | Ito et al. | 296/72 |

\* cited by examiner

*Primary Examiner* — Pinel Romain
(74) *Attorney, Agent, or Firm* — Harness, Dickey & Pierce, P.L.C.

(57) ABSTRACT

A mounting system for aligning and suspending an HVAC module onto a cross car beam is provided. The mounting system may include a first mounting feature attached to the HVAC module and a second mounting feature attached to the cross car beam such that the second mounting feature is inserted into the first mounting feature to align the HVAC module with the cross car beam and to suspend the HVAC module from the cross car beam.

15 Claims, 12 Drawing Sheets

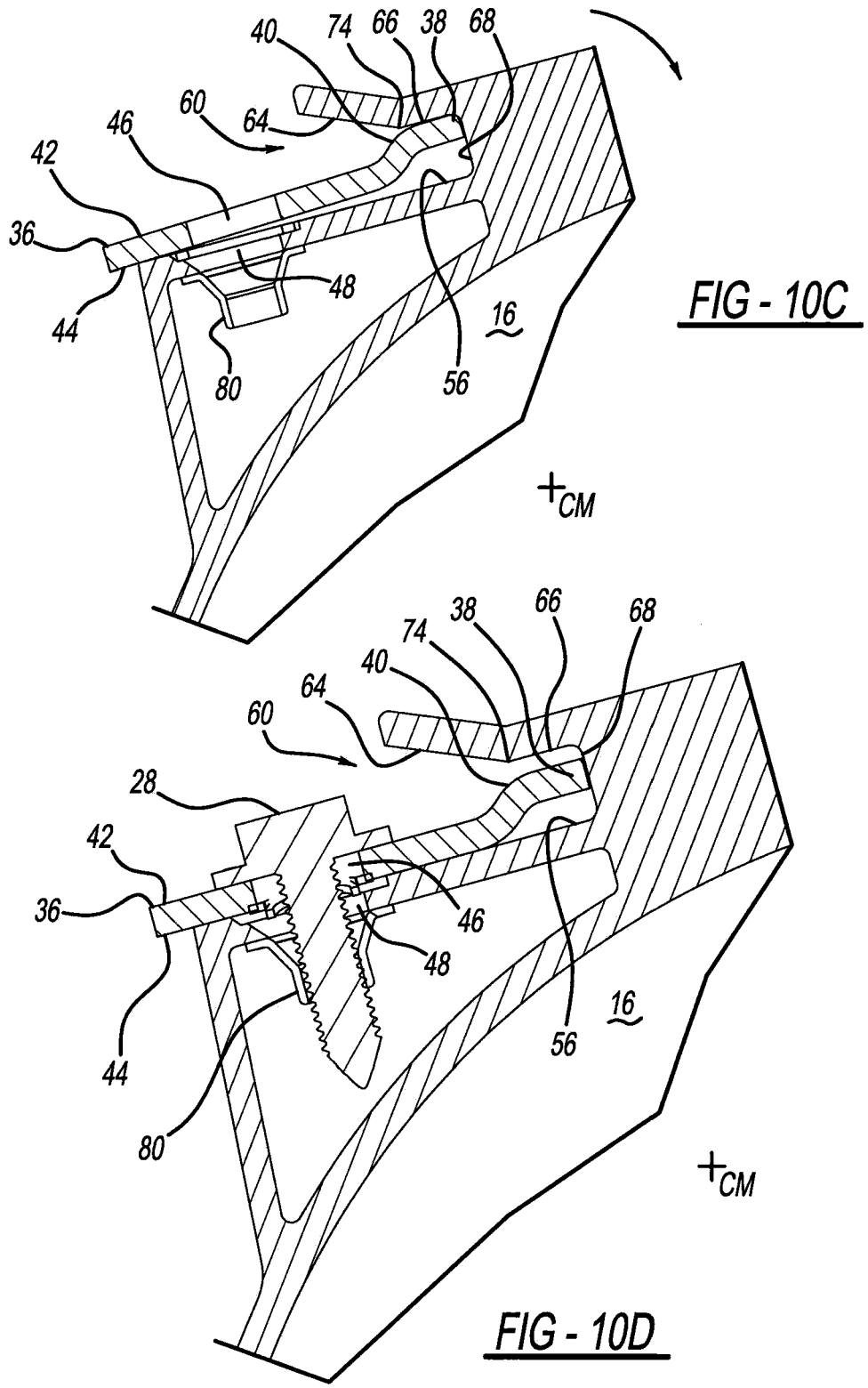

MOUNTING FEATURE TO CROSS CAR BEAM

CROSS-REFERENCE TO RELATED APPLICATIONS

This application claims the benefit of U.S. Provisional Application No. 61/718,864 filed Oct. 26, 2012. The entire disclosure of the above application is incorporated herein by reference.

FIELD

The present disclosure relates to HVAC modules and, more particularly, to a mounting feature for attaching an HVAC module to a vehicle cross car beam or structure.

BACKGROUND

The statements in this section merely provide background information related to the present disclosure and may not constitute prior art.

The dashboard assembly of a vehicle is a complex structure constructed from many components. The dashboard assembly may include dashboard components such as a cross car beam, an HVAC module, a crashpad assembly, climate controls, a radio head unit, a glove compartment, airbags, switchgear, vehicle instruments and associated wiring to and from each component.

Typically, in a vehicle production environment, each dashboard assembly is pre-assembled at a workstation prior to installation within a vehicle. Assembly may begin with a cross car beam mounted upon a support structure, such as a carrier. The dashboard components may be attached to the cross car beam until the dashboard assembly is fully constructed.

The workstation and carrier may be ergonomically designed to provide the user with supplies such as hand-tools and/or fasteners to assemble the dashboard assembly. In addition, the workstation may include quantities of each dashboard component to ensure that the user is equipped to assemble the dashboard assembly efficiently.

The workstation and carrier may also be ergonomically designed to improve safety and reduce the likelihood of injury. The carrier may suspend the dashboard assembly at a height convenient for the user in order to minimize stress, strain and fatigue due to bending of the knees and/or back. Further, the carrier may also rotate along the length of the dashboard assembly to provide the user with convenient access to all sides of the dashboard assembly.

Despite the ergonomic advantages that the workstation and carrier provide, the construction of the dashboard assembly may be a physically demanding and cumbersome process. Heavy dashboard components must be lifted, aligned and fastened to the cross car beam. For example, when attaching an HVAC module to the cross car beam, the HVAC module must first be lifted onto the cross car beam. The HVAC module must then be held in alignment with the cross car beam in order to fasten the HVAC module to the cross car beam. Typically, a lift-assist tool and/or additional staff are required to help lift, align and fasten the HVAC module. Either option, however, requires additional investment.

A need, therefore, exists for a mounting feature to allow a user to mount and fasten an HVAC module to a cross car beam without the assistance of a lift-assist tool and/or additional staff. More specifically, a need exists for a mounting feature which may allow a user to suspend an HVAC module from a cross car beam such that the hands of the user may be free to fasten the HVAC module to the cross car beam. Additionally, a need exists for a mounting feature which may self-align an HVAC module with a cross car beam such that the HVAC module may be quickly fastened to the cross car beam.

SUMMARY

The present teaching provide for a mounting system for suspending an HVAC module onto a cross car beam. The mounting system may include a first mounting feature attached to the HVAC module and a second mounting feature attached to the cross car beam such that the second mounting feature is inserted into the first mounting feature to suspend the HVAC module from the cross car beam.

The present teaching provides for an additional mounting system for aligning an HVAC module mounted on a cross car beam. The mounting system may include a first mounting feature attached to the HVAC module and a second mounting feature attached to the cross car beam such that the second mounting feature may be inserted into the first mounting feature to align the HVAC module with the cross car beam.

The present teaching provides for a method for aligning an HVAC module to a cross car beam. The method may entail inserting the cross car beam into the HVAC module and utilizing the force of gravity to rotate the HVAC module relative to the cross car beam such that the HVAC module is in alignment with the cross car beam.

DRAWINGS

The drawings described herein are for illustration purposes only and are not intended to limit the scope of the present disclosure in any way.

FIG. 10C is a cross-sectional view of the HVAC module along line 7-7 of FIG. 3 depicting the bracket and the notch as the HVAC module is suspended from the cross car beam; and FIG. 10D is a cross-sectional view of the HVAC module along line 7-7 of FIG. 3 depicting the HVAC module fastened to the cross car beam.

DETAILED DESCRIPTION

Figure 1:
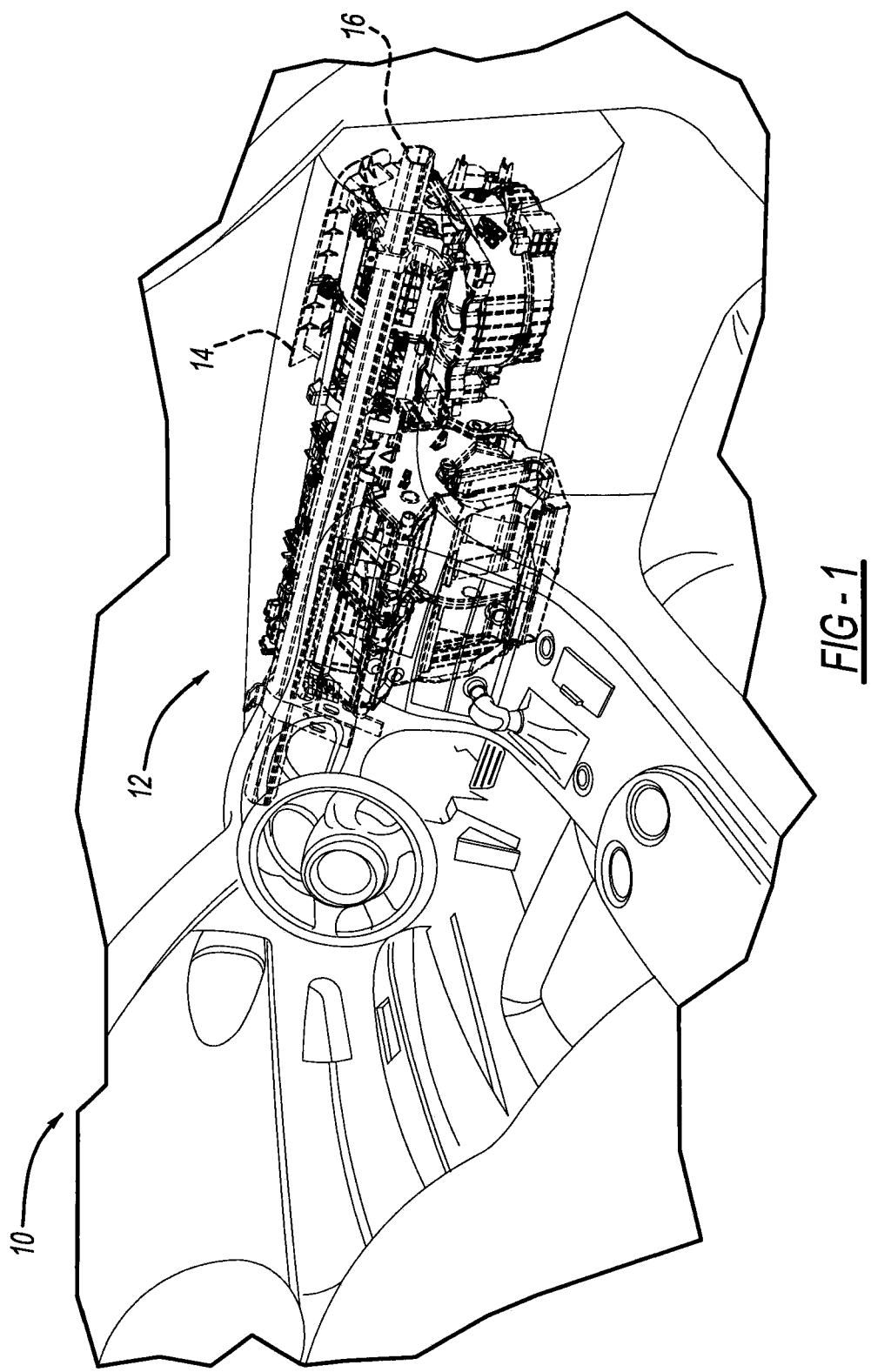
FIG. 1 is a perspective view of an automotive vehicle showing a passenger space with an exemplary cross car beam and an exemplary HVAC module according to the present teachings.

The following description is merely exemplary in nature and is not intended to limit the present disclosure, application, or uses. It should be understood that throughout the drawings, corresponding reference numerals indicate like or corresponding parts and features.

Referring FIG. 1, an automotive vehicle 10 with a dashboard assembly 12 according to the present teachings is illustrated. The dashboard assembly 12 may include an HVAC module 14 attached to a cross car beam 16. The dashboard assembly 12 may be attached to the vehicle 10 by fastening the cross car beam 16 to a driver-side hinge pillar (not shown) and a passenger-side hinge pillar (not shown). The HVAC module 14 may be formed from injection molded thermoplastic. The cross car beam 16 may be formed from hydroformed metal in conjunction with other suitable metal forming methods, such as bending and/or welding. The invention is not limited to a cross car beam constructed from metal and may include composite cross car beams of any material or construction including composite materials and/or laminate construction.

Figure 2A:
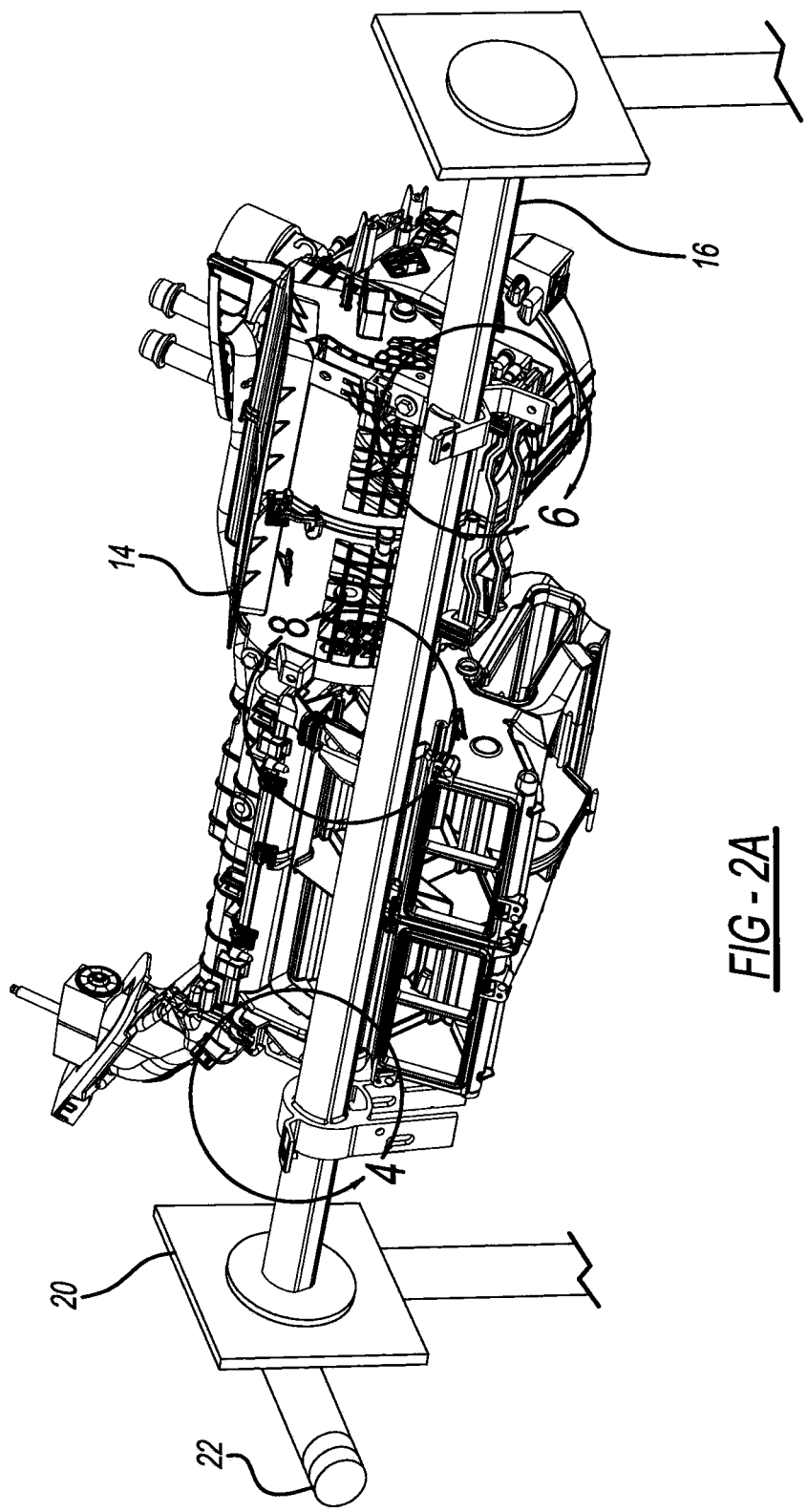
FIG. 2A is a perspective view of the cross car beam and the HVAC module attached to a carrier at an HVAC assembly workstation.

As shown in FIG. 2A, the dashboard assembly 12 may be pre-assembled at a workstation having a carrier 20. Pre-assembly may begin with the cross car beam 16 initially mounted upon the carrier 20. Individual dashboard components may be attached to the cross car beam 16 until the dashboard assembly 12 is fully assembled and ready for installation into the vehicle 10.

The HVAC module 14 and the cross car beam 16 may be mounted to the carrier 20 such that the HVAC module 14 and the cross car beam 16 may be positioned at a convenient height for a user to assemble the dashboard assembly 12. The carrier 20 may also allow the HVAC module 14 and the cross car beam 16 to rotate along the length of the cross car beam 16. The carrier 20 may have a handle 22 to allow a user to control the rotation of the HVAC module 14 and the cross car beam 16. Allowing rotation of the HVAC module 14 and the cross car beam 16 may provide a user with access to the rear and underside of the HVAC module 14 and the cross car beam 16. In addition, the cross car beam 16 may be rotated and held at any convenient angle for installing a dashboard component.

Figure 2B:
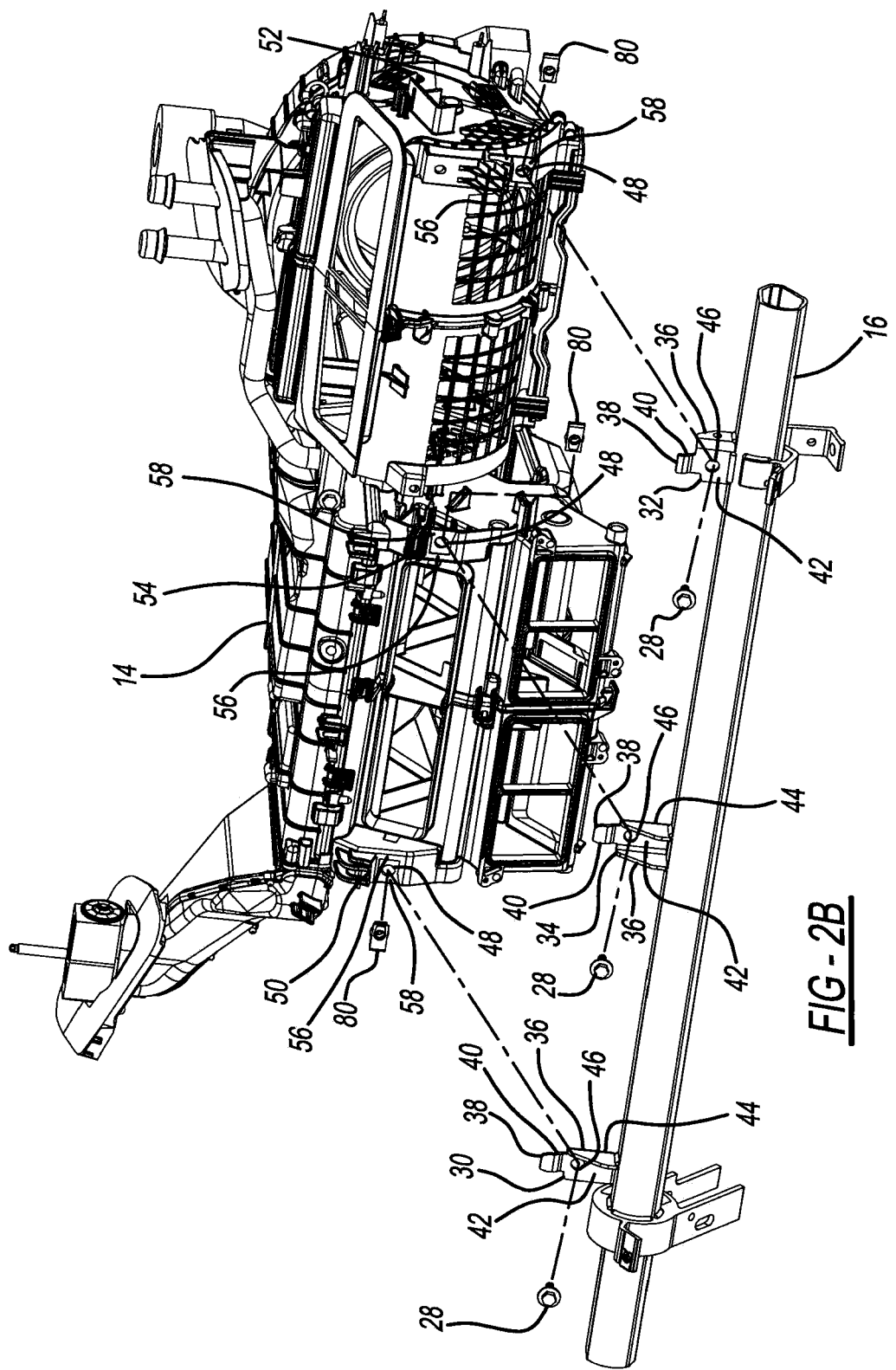
FIG. 2B is an exploded perspective view of the HVAC module and the cross car beam attached to the carrier of the HVAC assembly workstation.

As illustrated in FIG. 2B, the cross car beam 16 may have brackets 30, 32, 34 which may be attached to and spaced along the length of the cross car beam 16. The brackets 30, 32, 34 may have a base 36 attached to the cross car beam 16 and a tip 38 positioned opposite the cross car beam 16. The base 36 and the tip 38 may be connected by a bend 40. The base 36 may be welded to the cross car beam 16. The brackets 30, 32, 34 may have a top surface 42 and a bottom surface 44. The brackets 30, 32, 34 may have a hole 46 through the top surface 42 and the bottom surface 44 for receiving fasteners 28.

Figure 3:
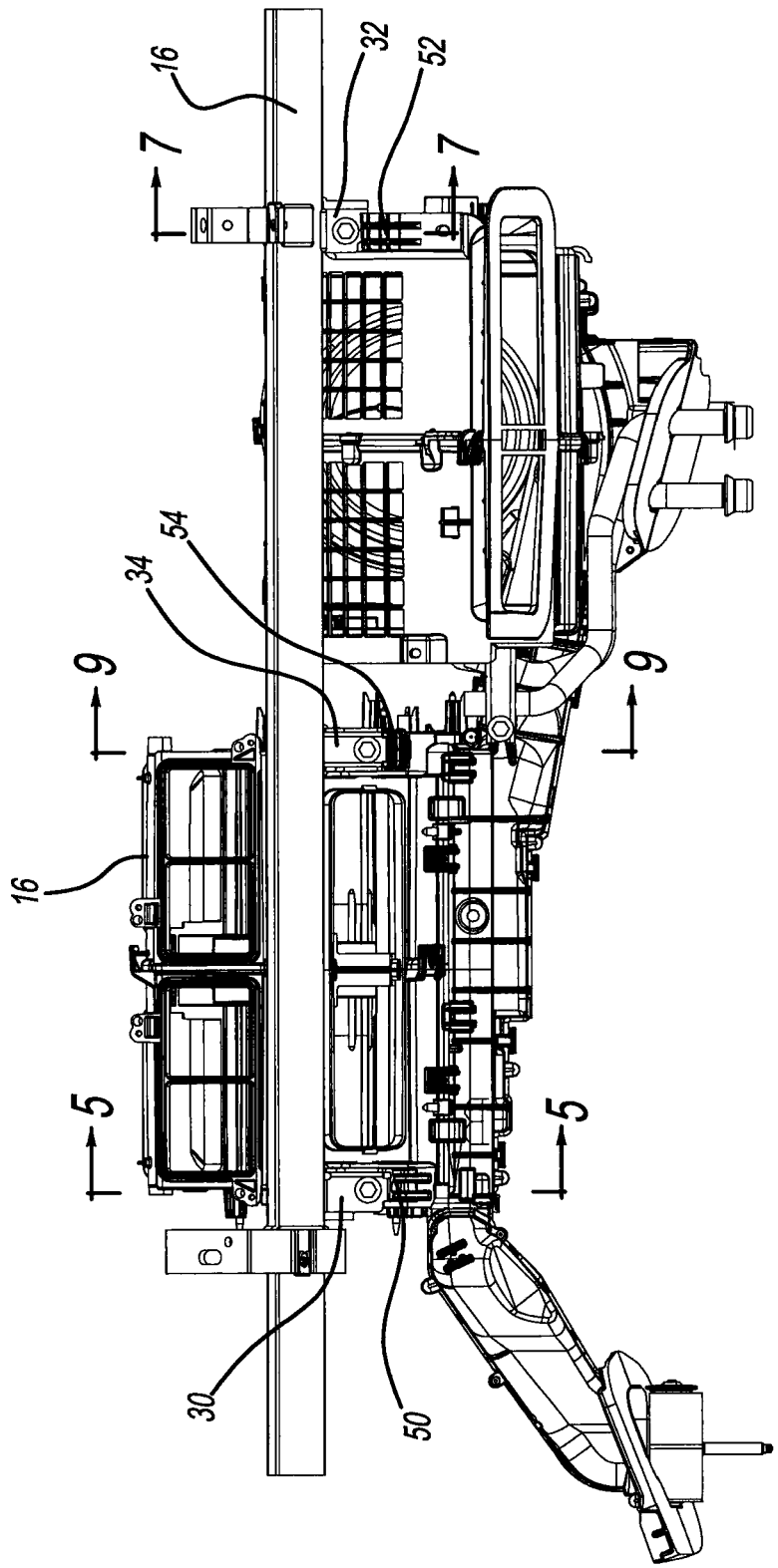
FIG. 3 is a top view of the cross car beam and HVAC module.
Figure 4:
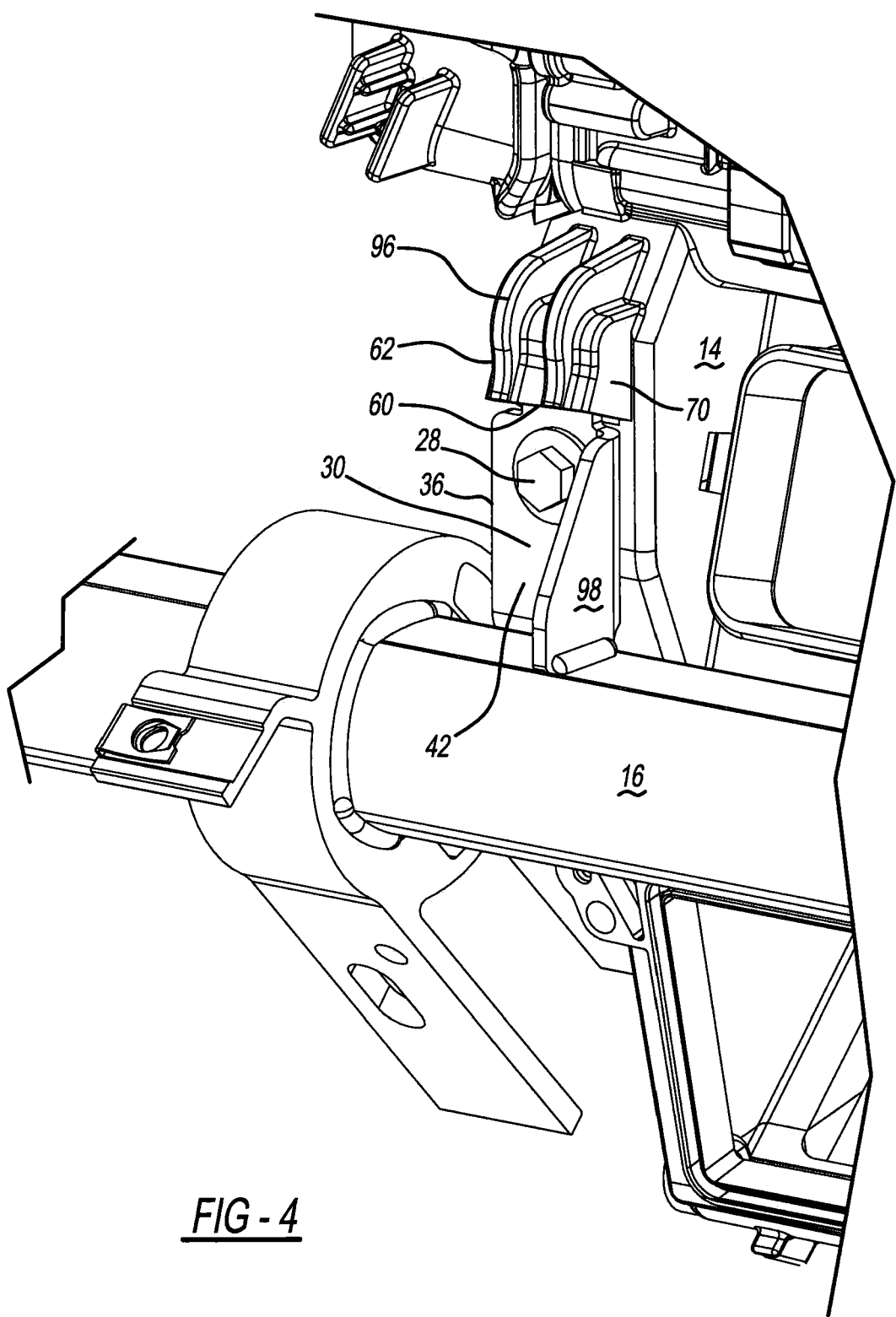
FIG. 4 is an enlarged perspective view of a bracket referenced in FIG. 2A.

As shown in FIG. 3, the HVAC module 14 may have notches 50, 52, 54 spaced along the length of the HVAC module 14. The notches 50, 52 may be positioned at the outer extents of the HVAC module 14 and the notch 54 may be positioned between notches 50, 52. The notches 50, 52, 54 may be integrally formed with the HVAC module 14.

Referring back to FIG. 2B, the notches 50, 52, 54 may have a control surface 56 which may engage the bottom surface 44 of the brackets 30, 32, 34 when the HVAC module 14 is mounted to the cross car beam 16. The control surface 56 may include a recess 58 and a hole 48 positioned within the recess 58. A clip-on nut 80 may be inserted into the recess 58 by clipping the clip-on nut 80 onto the HVAC module 14 and within the recess 58. The clip-on nut 80 may be a J-nut as is well known in the art. The clip-on nut 80 may be positioned within the recess 58 such that the clip-on nut 80 may be aligned with the hole 48. In addition, the clip-on nut 80 may have a thickness similar to the depth of the recess 58 such that the top surface of the clip-on nut 80 may be flush with the control surfaces 56. The hole 48 may be positioned within the recess 58 such that the fastener 28 may be inserted into the hole 48 and threadingly engage the clip-on nut 80.

FIGS. 4 through 7 depict the notches 50, 52. The notches 50, 52 may have a tapered opening 60 and a side opening 62 to provide a larger opening through which the tip 38 of the brackets 30, 32 may be inserted into the notches 50, 52. The larger opening may ease the burden of mounting the HVAC module 14 onto the cross car beam 16 by allowing the tip 38 to be inserted into the notches 50, 52 at a broad range of angles.

Figure 5:
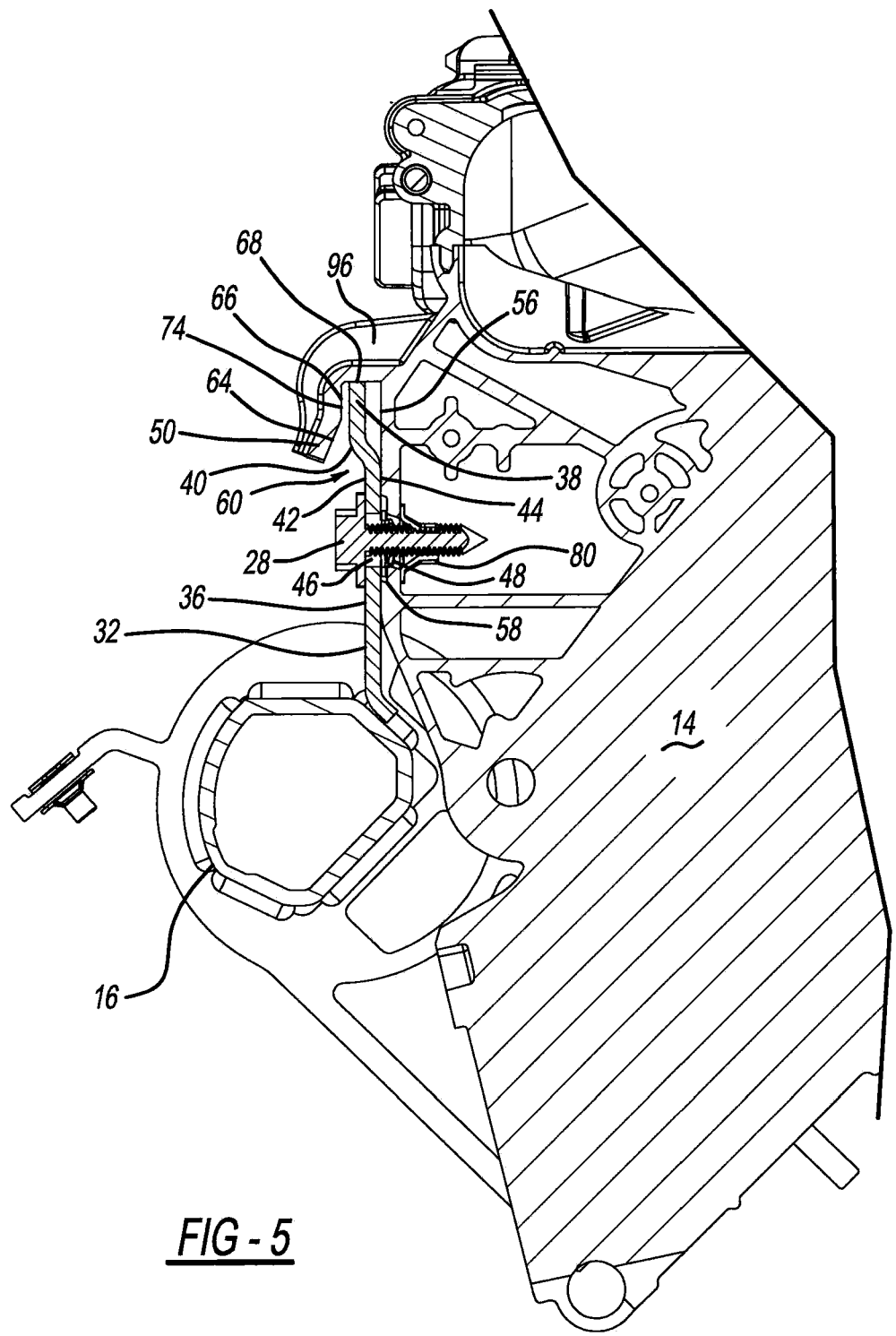
FIG. 5 is a cross-sectional view of the HVAC module along line 5-5 of FIG. 3.
Figure 6:
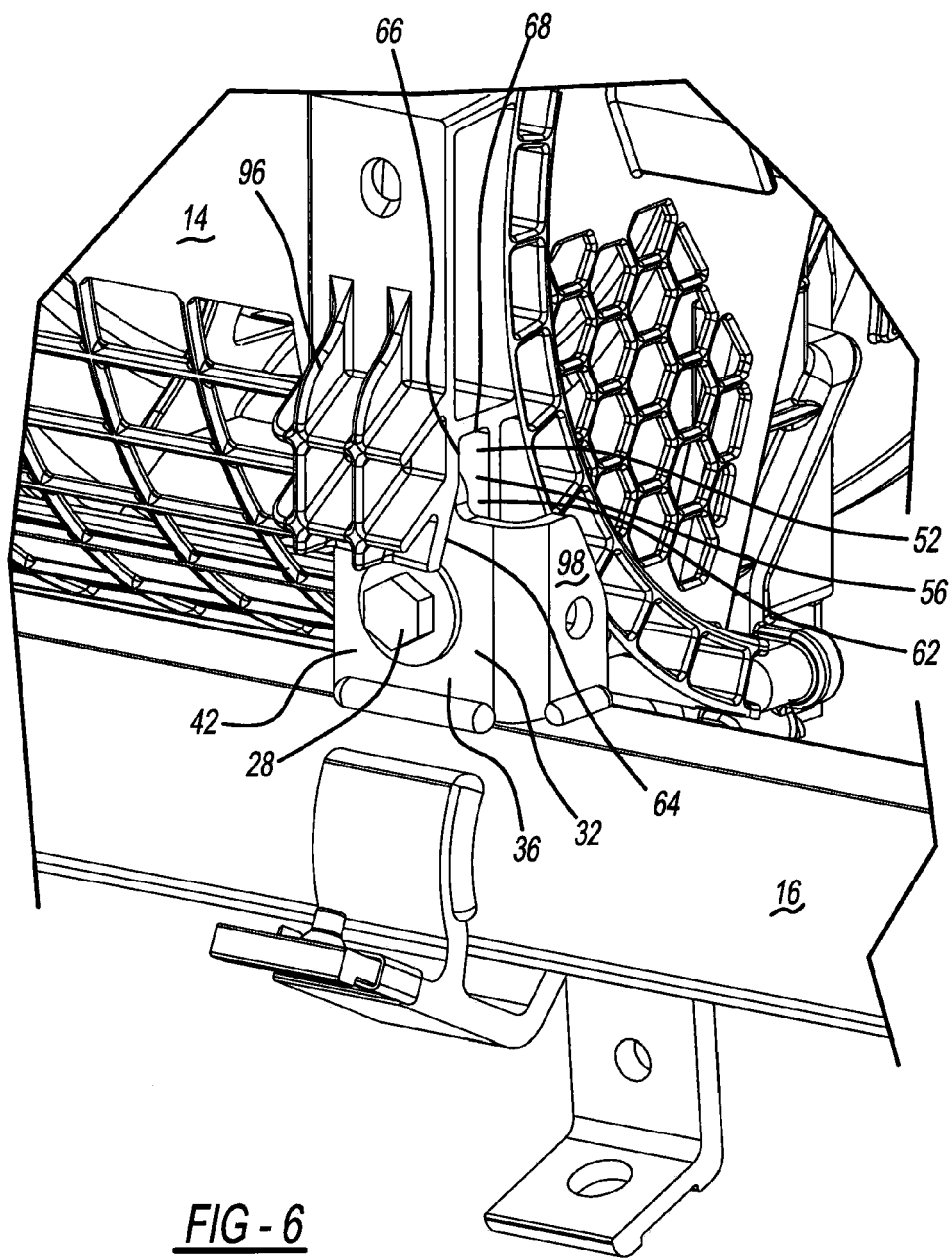
FIG. 6 is an enlarged perspective view of a bracket referenced in FIG. 2A.
Figure 7:
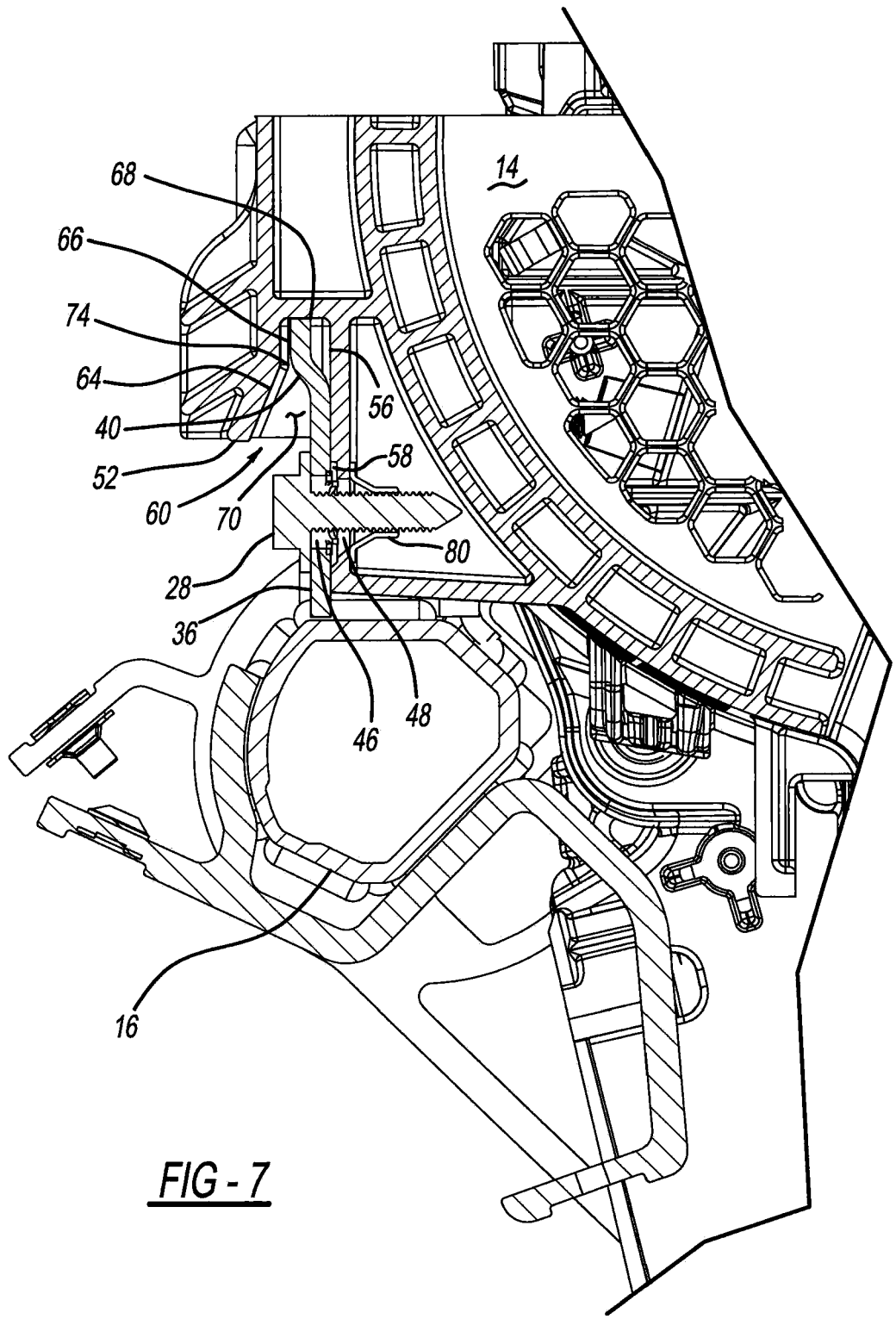
FIG. 7 is a cross-sectional view of the HVAC module along line 7-7 of FIG. 3.

As illustrated in FIGS. 5 and 7, the tapered opening 60 may be defined by a tapered surface 64, a load-bearing surface 66, a base surface 68, a sidewall 70, the side opening 62 and the control surface 56. The tapered surface 64 may be positioned opposite to the control surface 56 and adjacent to the load-bearing surface 66. The tapered surface 64 and the load-bearing surface 66 may be connected by a ridge 74. The load-bearing surface 66 may be positioned opposite to the control surface 56 and connected to the base surface 68. The base surface 68 maybe connected to the control surface 56 and the sidewall 70. The sidewall 70 may be positioned opposite to the side opening 62.

The sidewall 70 may provide lateral support and aid in the lateral alignment of the HVAC module 14 with the cross car beam 16. The sidewall 70 may be positioned on the side of the notches 50, 52 adjacent to the notch 54. When initially inserting the tip 38 of the brackets 30, 32 into the notches 50, 52, the sidewall 70 may abut the tip 38 to align the HVAC module 14 with the cross car beam 16.

Figure 8:
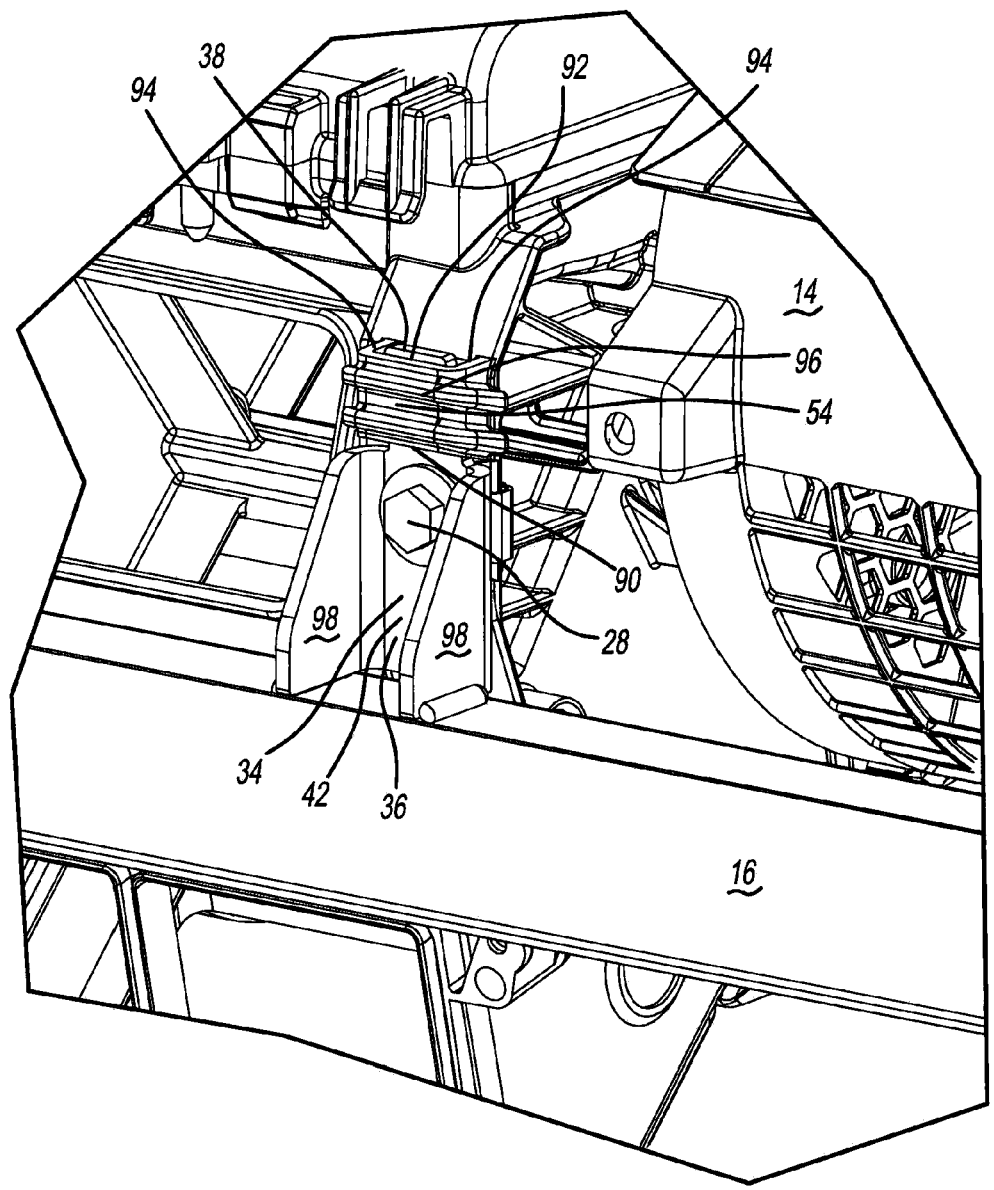
FIG. 8 is an enlarged perspective view of a bracket referenced in FIG. 2A.
Figure 9:
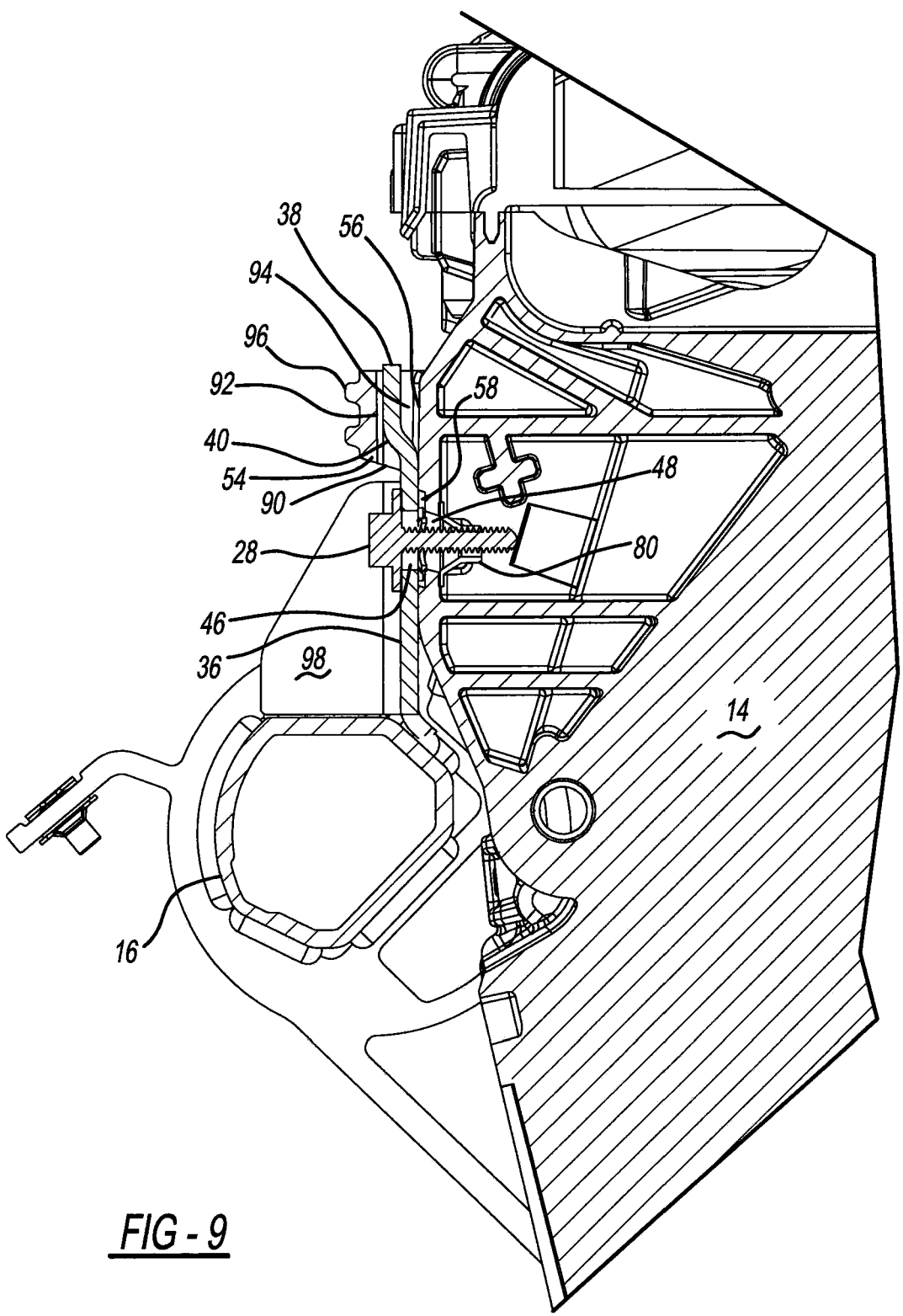
FIG. 9 is a cross-sectional view of the HVAC module along line 9-9 of FIG. 3.

FIGS. 8 and 9 depict the notch 54. The notch 54 may have an alignment slot 90 such that the notch 54 may laterally align the HVAC module 14 with the cross car beam 16 when inserting the tip 38 into the notch 54. The alignment slot 90 may be defined by a load-bearing surface 92, guide walls 94, and the control surface 56. The load-bearing surface 92 may be positioned opposite to the control surface 56 and adjacent to the guide walls 94. The guide walls 94 may be spaced at a distance apart which is slightly greater than the width of the tip 38. When the tip 38 of the bracket 34 is inserted into the alignment slot 90, the guide walls 94 may be in sliding contact with the tip 38 such that the guide walls 94 may guide the tip 38 into the alignment slot 90. As a result, the guiding of the tip 38 into the alignment slot 90 may laterally align the HVAC module 14 with the cross car beam 16.

As illustrated in FIGS. 10A through 10D, the HVAC module 14 may rotate relative to the cross car beam 16 when the HVAC module 14 is initially mounted to the cross car beam 16. The rotation may cause the HVAC module 14 to self-align with the cross car beam 16 such that the holes 46, 48 may move into alignment. The rotation may also allow the HVAC module 14 to be suspended by the cross car beam 16 such that the user may insert the fasteners 28 into the holes 46, 48 and fasten the HVAC module 14 to the cross car beam 16.

The tip 38 and the tapered opening 60 may be shaped to utilize the center of mass CM of the HVAC module 14 to facilitate the rotation of the HVAC module 14 relative to the cross car beam 16. The tip 38 may have the bend 40 to create a rotational axis about which the HVAC module 14 may rotate. In addition, the ridge 74 of the tapered opening 60 may also create a rotational axis about which the HVAC module 14 may rotate. When the tip 38 is inserted into the tapered opening 60, the center of mass CM of the HVAC module 14 may be located a distance from the axes of rotation A, B. The center of mass CM being offset from the axes of rotation may create a rotating moment about the axes of rotation.

In operation, the construction of the dashboard assembly may begin with the HVAC module 14 being lifted by the user onto the cross car beam 16. The user may rotate the handle 22 of the carrier 20 such that the cross car beam 16 may be oriented with the brackets 30, 32, 34 pointing upwards and away from the ground (not shown). The HVAC module 14 may be lifted onto the cross car beam 16 such that the tip 38 of the brackets 30, 32, 34 are inserted into the tapered openings 60 and the alignment slot 90.

Figures 10A, 10B:
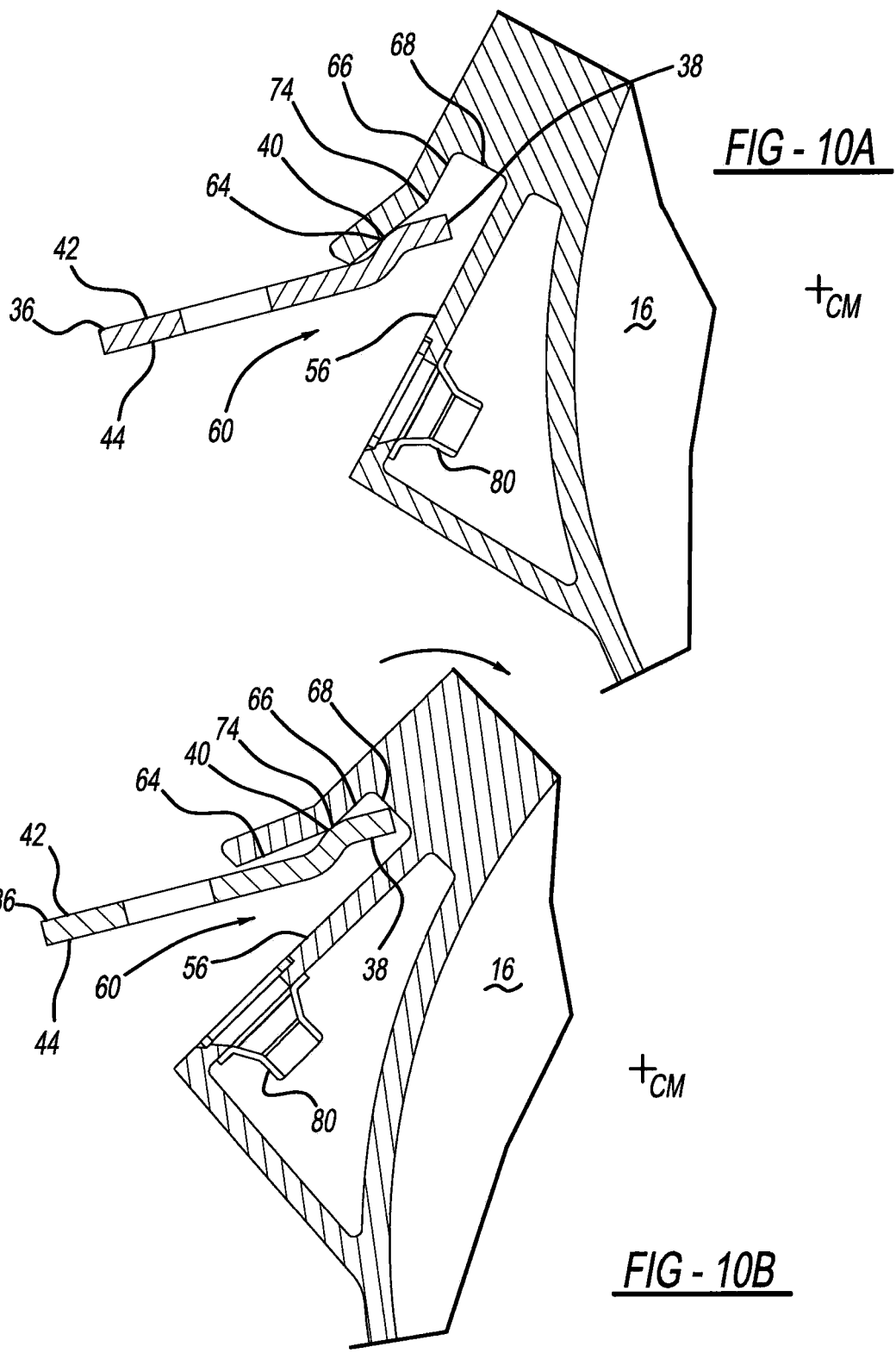
FIG. 10A is a cross-sectional view of the HVAC module along line 7-7 of FIG. 3 depicting the bracket entering the notch as the HVAC module is mounted onto the cross car beam.
FIG. 10B is a cross-sectional view of the HVAC module along line 7-7 of FIG. 3 depicting the bracket sliding into the notch as the HVAC module is mounted onto the cross car beam.

As shown in FIG. 10A, as the tip 38 of the brackets 30, 32 enter the tapered opening 60 of notches 50, 52, the top surface 42 of the tip 38 may contact and slide against the tapered surface 64. The tip 38 will slide further into the tapered opening 60 as the HVAC module 14 slides onto the cross car beam 16. Further, as the tip 38 of the bracket 34 enters the alignment slot 90 of notch 54, the guide walls 94 may contact and guide the tip 38 such that the HVAC module 14 may be laterally aligned with the cross car beam 16.

As illustrated in FIG. 10B, the tip 38 of the brackets 30, 32 may slide within the tapered opening 60 until the tip 38 contacts the base surface 68. When the tip 38 contacts the base surface 68, the HVAC module 14 may begin to rotate about the bend 40 and/or the ridge 74 due to the rotating moment caused by the offset center of mass CM of the HVAC module 14. The bend 40 and the ridge 74 may both provide a rotational axis around which the HVAC module 14 may rotate.

Referring to FIG. 10C, the HVAC module 14 may rotate about the bend 40 and/or the ridge 74 until the bottom surface 44 contacts the control surface 56. Rotating the control surface 56 into contact with the bottom surface 44 may align the holes 46, 48 such that the fasteners 28 may be inserted into the holes 46, 48.

Also illustrated in FIG. 10C, the rotating moment may press and hold the HVAC module 14 against the cross car beam 16 such that the HVAC module 14 may be suspended by the brackets 30, 32. The rotating moment may hold the control surface 56 against the bottom surface 44 and the top surface 42 against the load-bearing surface 66. As a result, the hands of the user may be free to insert fasteners 28 within holes 46, 48 and tighten fasteners 28 to secure the HVAC module 14 to the cross car beam 16. Suspending the HVAC module 14 from the cross car beam 16 may eliminate the need for a lift-tool and/or additional staff to hold and/or adjust the alignment of the HVAC module 14 relative to the cross car beam 16 while the user inserts and tightens the fasteners 28. As shown in FIG. 10D, the fasteners 28 may be inserted into the holes 46, 48 and threadingly engage clip-on nuts 80 to secure the HVAC module 14 to the cross car beam 16.

The notches 50, 52, 54 may have reinforcing ribs 96 integrally formed along the exterior surfaces of the notches 50, 52, 54. The reinforcing ribs 96 may increase the strength and stiffness of the notches 50, 52, 54 to ensure that the notches 50, 52, 54 may support the weight of the HVAC module 14 while suspended from the cross car beam 16. In addition, the brackets 30, 32, 34 may have reinforcing members 98 such that the brackets 30, 32, 34 may support the weight of the HVAC module 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mounting system for suspending an HVAC module from a cross car beam, the mounting system comprising:
    a first mounting feature attached to the HVAC module, the first mounting feature includes a notch positioned at an outer extent of the HVAC module; and
    a second mounting feature attached to the cross car beam, the second mounting feature includes a base attached to the cross car beam and a tip positioned opposite to the cross car beam,
    wherein the tip is inserted into the notch to suspend the HVAC module from the cross car beam.

2. The mounting system of claim 1, wherein the first mounting feature has an outwardly expanding opening.

3. The mounting system of claim 1, wherein the first mounting feature is integral with the HVAC module.

4. The mounting system of claim 1, wherein the first mounting feature has a pivot point about which HVAC module may rotate relative to the cross car beam.

5. The mounting system of claim 1, wherein the second mounting feature has a pivot point about which HVAC module may rotate relative to the cross car beam.

6. The mounting system of claim 1, wherein the first mounting feature has reinforcing ribs.

7. The mounting system of claim 4, wherein the HVAC module has a center of mass positioned a distance from the pivot point.

8. The mounting system of claim 1, wherein the second mounting feature is welded to the cross car beam.

9. The mounting system of claim 1, further comprising:
    a recess positioned on the first mounting feature; and
    a clip-on nut slidingly attached to the first mounting feature and positioned within the recess.

10. A mounting system for aligning an HVAC module mounted on a cross car beam, the mounting system comprising:
    a first mounting feature attached to the HVAC module, the first mounting feature includes a notch positioned at the outer extent of the HVAC module and the notch; and
    a second mounting feature attached to the cross car beam, the second mounting feature includes a base attached to the cross car beam and a tip positioned opposite to the cross car beam,
    wherein the tip is inserted into the notch to align the HVAC module with the cross car beam.

11. The mounting system of claim 10, wherein the first mounting feature comprises a slot having sidewalls.

12. The mounting system of claim 10, wherein the first mounting feature is integral with the HVAC module.

13. A method for aligning an HVAC module to a cross car beam, the method comprising:
    inserting a tip positioned opposite to the cross car beam into a notch positioned at the outer extent of the HVAC module; and utilizing the force of gravity to rotate the HVAC module relative to the cross car beam such that the HVAC module is aligned with the cross car beam.

14. The method of claim 13, further comprising:

utilizing the force of gravity to hold the HVAC module in alignment with the cross car beam such the HVAC module is suspended by the cross car beam.

15. The method of claim 13, wherein the HVAC module has a first fastener hole and the cross car beam has a second fastener hole and utilizing the force of gravity to rotate the HVAC module relative to the cross car beam comprises rotating the first fastener hole into alignment with the second fastener hole.

* * * * *